United States Patent
Shimura

(10) Patent No.: US 10,557,745 B2
(45) Date of Patent: Feb. 11, 2020

(54) ELECTROMAGNETIC FLOW METER AND MISWIRING DETECTION METHOD

(71) Applicant: Yokogawa Electric Corporation, Musashino-shi, Tokyo (JP)

(72) Inventor: Toru Shimura, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 231 days.

(21) Appl. No.: 15/609,551

(22) Filed: May 31, 2017

(65) Prior Publication Data
US 2017/0350748 A1 Dec. 7, 2017

(30) Foreign Application Priority Data
Jun. 1, 2016 (JP) ................... 2016-109884

(51) Int. Cl.
 *G01F 25/00* (2006.01)
 *G01F 1/58* (2006.01)
 *G01F 1/60* (2006.01)

(52) U.S. Cl.
 CPC .......... *G01F 25/0007* (2013.01); *G01F 1/586* (2013.01); *G01F 1/60* (2013.01)

(58) Field of Classification Search
 CPC . G01F 1/58; G01F 1/586; G01F 1/588; G01F 1/60; G01F 25/0007
 USPC ................ 73/1.16, 861.12, 861.16; 324/537, 324/750.02
 See application file for complete search history.

(56) References Cited

U.S. PATENT DOCUMENTS

2013/0289897 A1 10/2013 Yamaguchi et al.
2015/0241255 A1 8/2015 Zhang et al.

FOREIGN PATENT DOCUMENTS

| CN | 104864922 A | 8/2015 |
|---|---|---|
| EP | 2950061 A1 | 12/2015 |
| JP | 2015-158445 A | 9/2015 |

OTHER PUBLICATIONS

Communication dated Oct. 9, 2017, from the European Patent Office in counterpart European Application No. 17173830.5.

*Primary Examiner* — Benjamin R Schmitt
(74) *Attorney, Agent, or Firm* — Sughrue Mion, PLLC

(57) ABSTRACT

An electromagnetic flow meter includes a flowtube including a coil disposed in the vicinity of a measurement tube, and electrodes disposed on the measurement tube, a converter including an excitation unit configured to generate an excitation signal and output the excitation signal to the coil through an excitation cable, and a detection signal receiving unit configured to receive a detection signal from the electrodes through a signal cable, and generate a flow rate signal, and a miswiring detection unit configured to perform miswiring diagnosis on the excitation cable or the signal cable on the basis of a difference between a change amount of the flow rate signal when the excitation signal is being output and a change amount of the flow rate signal when the excitation signal is not being output.

7 Claims, 13 Drawing Sheets

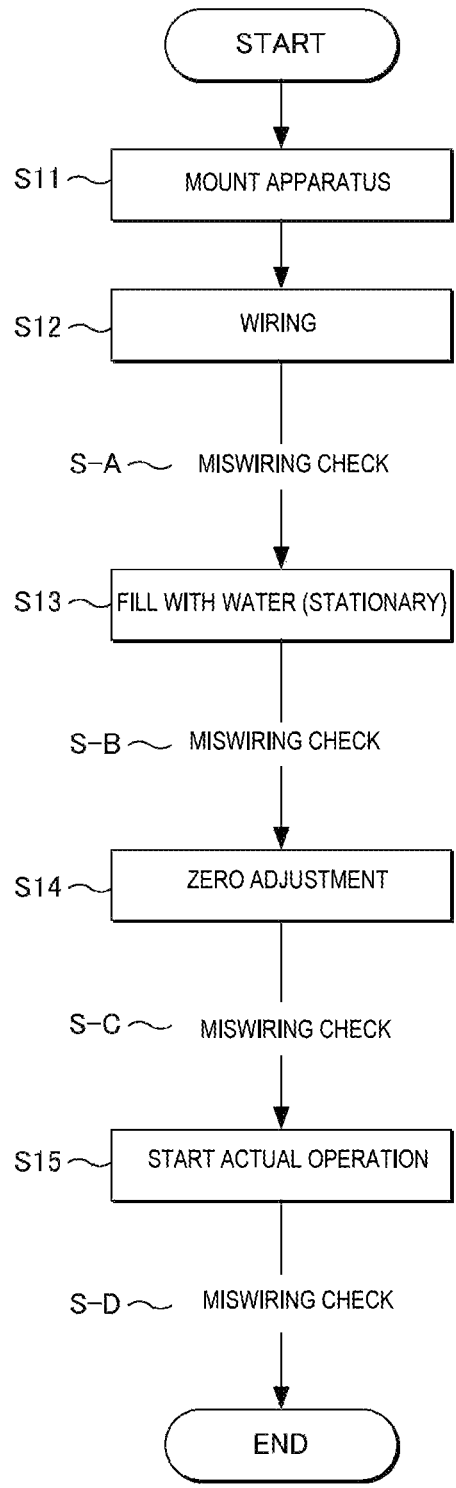

FIG. 4A  DURING NORMAL WIRING STATE

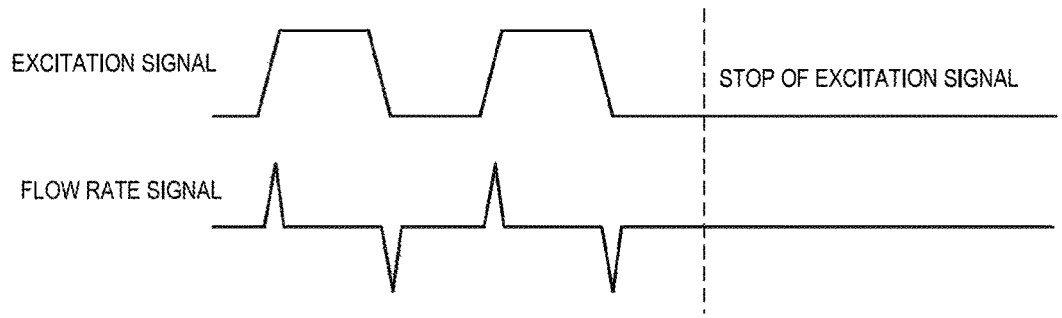

FIG. 4B  WHEN MISWIRING OCCURS IN EXCITATION CABLE, AND THE OTHER EXCITATION SIGNAL IS INPUT
WHEN MISWIRING OCCURS IN SIGNAL CABLE, AND THE OTHER EXCITATION SIGNAL IS INPUT

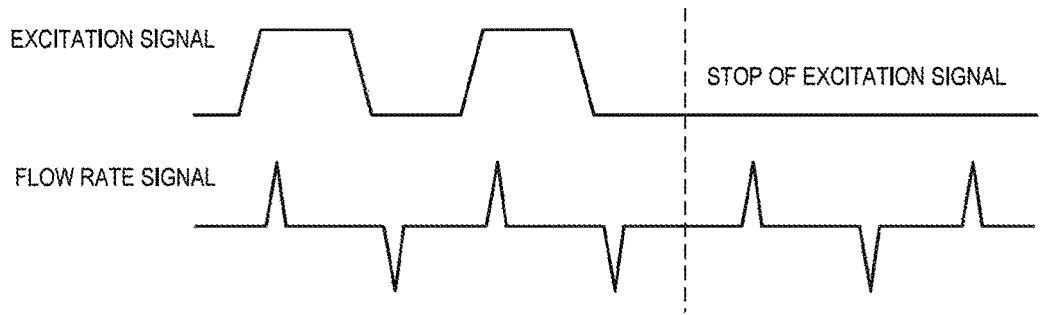

FIG. 4C  WHEN MISWIRING OCCURS IN EXCITATION CABLE, AND ANY EXCITATION SIGNAL IS NOT INPUT
WHEN MISWIRING OCCURS IN SIGNAL CABLE, AND ANY EXCITATION SIGNAL IS NOT INPUT

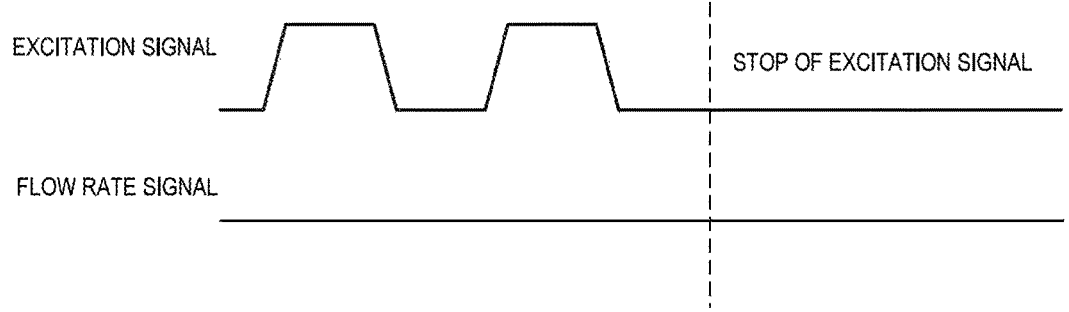

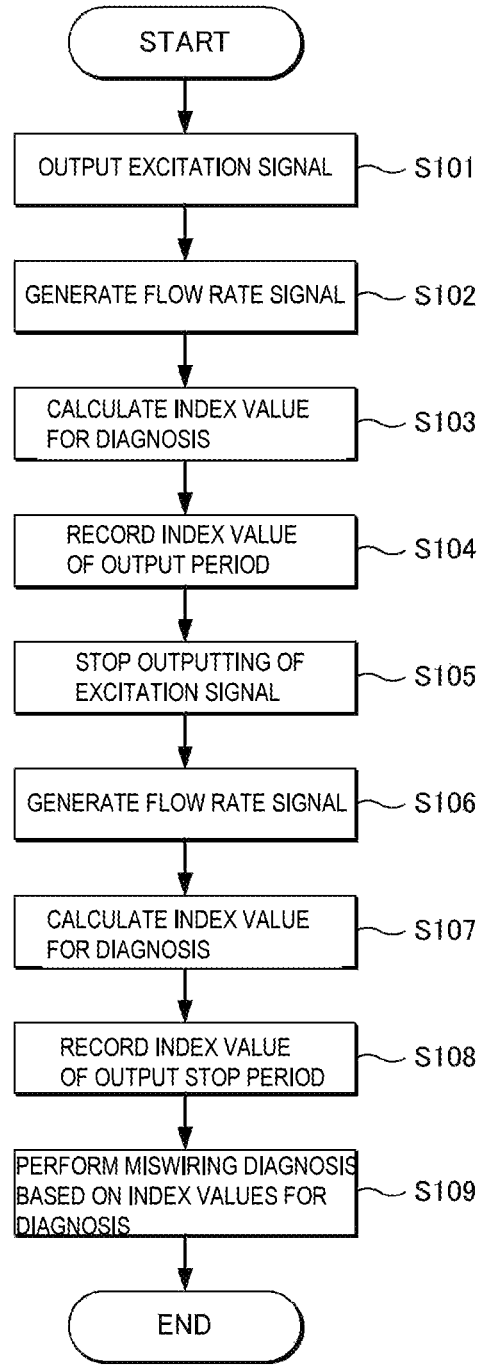

DURING NORMAL WIRING STATE

WHEN MISWIRING OCCURS IN EXCITATION CABLE, AND THE OTHER EXCITATION SIGNAL IS INPUT
WHEN MISWIRING OCCURS IN SIGNAL CABLE, AND THE OTHER EXCITATION SIGNAL IS INPUT

WHEN MISWIRING OCCURS IN EXCITATION CABLE, AND ANY EXCITATION SIGNAL IS NOT INPUT
WHEN MISWIRING OCCURS IN SIGNAL CABLE AND ANY EXCITATION SIGNAL IS NOT INPUT

FIG. 10A  DURING NORMAL WIRING STATE
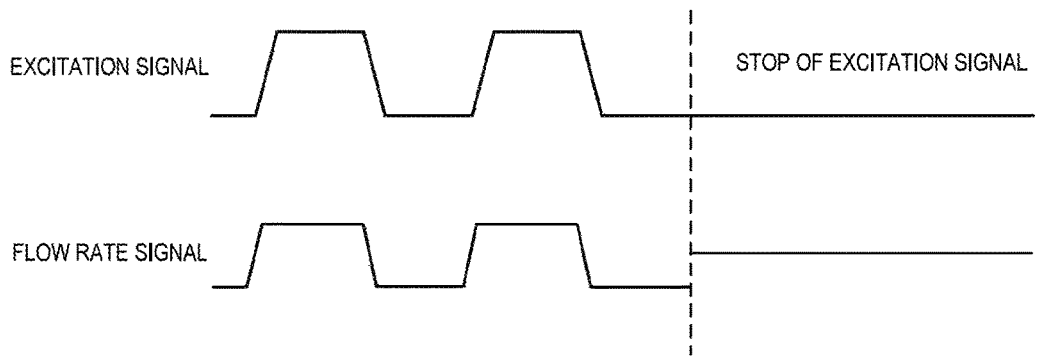
FIG. 10B  WHEN MISWIRING OCCURS IN EXCITATION CABLE, AND THE OTHER EXCITATION SIGNAL IS INPUT
WHEN MISWIRING OCCURS IN SIGNAL CABLE, AND THE OTHER EXCITATION SIGNAL IS INPUT
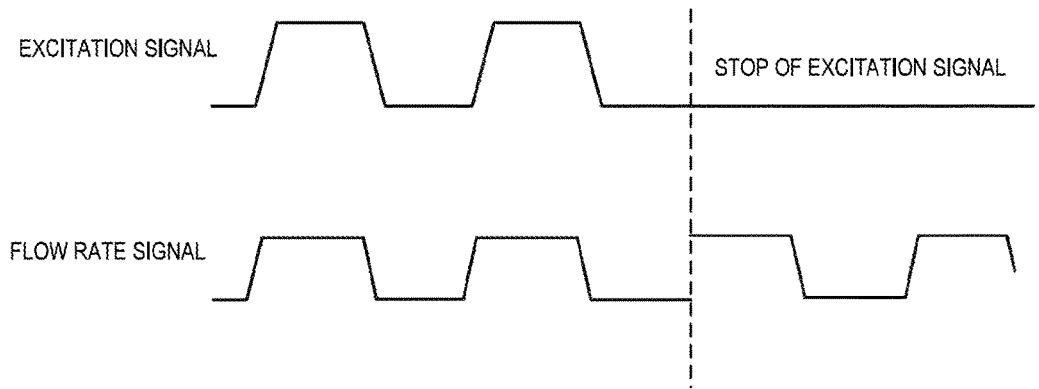
FIG. 10C
WHEN MISWIRING OCCURS IN EXCITATION CABLE, AND ANY EXCITATION SIGNAL IS NOT INPUT
WHEN MISWIRING OCCURS IN SIGNAL CABLE, AND ANY EXCITATION SIGNAL IS NOT INPUT
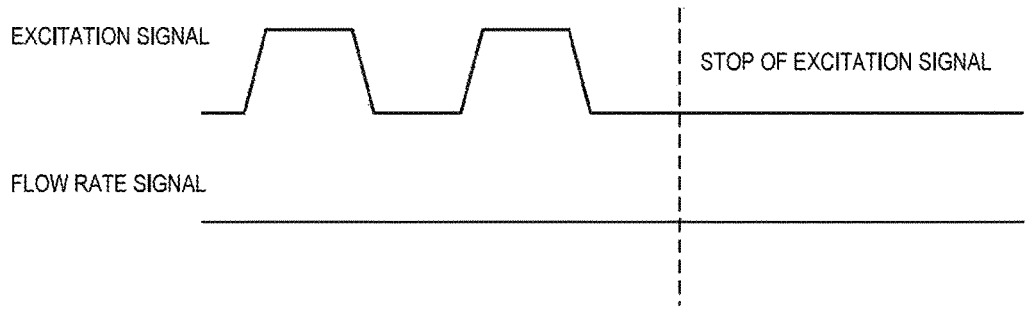

ELECTROMAGNETIC FLOW METER AND MISWIRING DETECTION METHOD

CROSS-REFERENCE TO RELATED APPLICATION

The present application claims priority from Japanese Patent Application No. 2016-109884 filed on Jun. 1, 2016, the entire content of which is incorporated herein by reference.

BACKGROUND

Technical Field

The present invention relates to an electromagnetic flow meter having a converter and a flowtube, and more particularly to a technology for detecting miswiring between the converter and the flowtube.

Related Art

Electromagnetic flow meters for measuring the flow rate of conductive fluid using electromagnetic induction are robust and precise, and thus are widely used for industrial use. The electromagnetic flow meters make a conductive fluid to be measured flow in a measurement tube to which a magnetic field is applied in an orthogonal direction, and measure a generated electromotive force. Since this electromotive force is proportional to the flow velocity of the fluid to be measured, it is possible to obtain the volumetric flow rate of the fluid to be measured on the basis of the measured electromotive force.

FIG. 11 is a block diagram illustrating the configuration of an electromagnetic flow meter of the related art. As shown in FIG. 11, an electromagnetic flow meter 50 is configured to include a converter 500 and a flowtube 530.

The flowtube 530 includes a core 531 having a coil 532 wound thereon, and a pair of detection electrodes 533 and an earth electrode 534 attached to a measurement tube 300. The measurement tube 300 is connected to piping (not shown in the drawing).

The converter 500 includes an excitation unit 501 configured to generate and output an excitation signal, a detection signal receiving unit 502 configured to receive a detection signal and generate a flow rate signal, a flow rate calculating unit 503 configured to calculate a flow rate on the basis of the flow rate signal, and an output unit 504 configured to display a measurement result and the like or transmit them to another apparatus.

The excitation signal output from the excitation unit 501 is input to the coil 532 through an excitation cable 541, and a detection signal from the detection electrodes 533 is input to the detection signal receiving unit 502 through a signal cable 542.

In some cases such as a case of newly mounting the electromagnetic flow meter 50 on piping, or re-mounting the electromagnetic flow meter 50 demounted for maintenance or the like, in general, work is performed in a sequence as shown in FIG. 12. Specifically, the flowtube 530 is attached to the piping, and the converter 500 is mounting at a predetermined mounting place (STEP S11). Subsequently, the excitation cable 541 and the signal cable 542 are installed so as to be connected to the flowtube 530 and the converter 500, respectively (STEP S12).

Prior to start of an actual operation, zero adjustment is performed. The zero adjustment is performed in a state where the measurement tube 300 is filled with water (STEP S13) and there is no flow (STEP S14). If zero adjustment finishes, an actual operation is started by making a fluid to be measured flow in the measurement tube 300 in a normal state (STEP S15).

[Patent Document 1] Japanese Patent Application Laid-Open No. 2015-158445

The mounting place of the flowtube 530 and the mounting place of the converter 500 do not necessarily need to be close to each other, and in many cases, a plurality of electromagnetic flow meters is mounted close to one another. For this reason, in a case where a converter A 500a and a flowtube A 530a should be connected to each other by an excitation cable and a signal cable, and a converter B 500b and a flowtube B 530b should be connected to each other by an excitation cable and a signal cable, as shown in FIG. 13, miswiring may occur.

As aspects of miswiring, for example, as shown in 14A, the signal cable of the converter A 500a may be connected to the flowtube B 530b. In this case, if the flowtube B 530b is connected to the converter B 500b by an excitation cable as shown in FIG. 14B, a signal detected by the flowtube B 530b may be input to the converter A 500a.

Also, as shown in FIG. 15A, the excitation cable of the converter A 500a may be connected to the flowtube B 530b. In this case, if an excitation cable from the converter B 500b is connected to the flowtube B 530b as shown in FIG. 15B, a signal detected on the basis of an excitation signal from the converter B 500b may be input to the converter A 500a.

When miswiring occurs, it is often found because an assumed flow rate and a display value do not match after start of an actual operation (STEP S15 of FIG. 12). For example, in a case where a plurality of electromagnetic flow meters is activated at the same time, at the early stage, their operations appear to be normal; however, as time goes on, the time lag between excitation timings and sampling timings of a flow rate signal increases, and thus abnormality of flow rate display values may become obvious.

If miswiring is found out, a worker needs to stop the actual operation, and return to the wiring process (STEP S12), and re-perform zero adjustment (STEP S14), and thus waste of time and an increase in the number of extra processes are caused, resulting in an increase in cost.

SUMMARY

Exemplary embodiments of the invention provide an electromagnetic flow meter and a miswiring detection method, which can easily detect miswiring of an excitation cable or a signal cable of the electromagnetic flow meter.

An electromagnetic flow meter according to an exemplary embodiment, comprises:

a flowtube including a coil disposed in the vicinity of a measurement tube, and electrodes disposed on the measurement tube;

a converter including an excitation unit configured to generate an excitation signal and output the excitation signal to the coil through an excitation cable, and a detection signal receiving unit configured to receive a detection signal from the electrodes through a signal cable, and generate a flow rate signal; and a miswiring detection unit configured to perform miswiring diagnosis on the excitation cable or the signal cable on the basis of a difference between a change amount of the flow rate signal when the excitation signal is being output and a change amount of the flow rate signal when the excitation signal is not being output.

In a case where the change amount difference does not exceed a predetermined reference value, the miswiring detection unit may determine that miswiring occurs in the excitation cable or the signal cable.

The change amount of the flow rate signal may be calculated on the basis of a difference between a maximum value and minimum value of the flow rate signal in a predetermined period.

The predetermined period may be a period equal to or longer than one cycle of the excitation signal.

The change amount of the flow rate signal may be a value directly or indirectly representing a magnitude of differential noise included in the flow rate signal.

An miswiring detection method, according to an exemplary embodiment, of an electromagnetic flow meter which includes a flowtube including a coil disposed in the vicinity of a measurement tube, and electrodes disposed on the measurement tube, and a converter including an excitation unit configured to generate an excitation signal and output the excitation signal to the coil through an excitation cable, and a detection signal receiving unit configured to receive a detection signal from the electrodes through a signal cable, and generate a flow rate signal, comprises:

performing miswiring diagnosis on the excitation cable or the signal cable on the basis of the difference between a change amount of the flow rate signal when the excitation signal is being output and a change amount of the flow rate signal when the excitation signal is not being output.

According to the present invention, it becomes possible to easily detect miswiring of an excitation cable or a signal cable of an electromagnetic flow meter.

BRIEF DESCRIPTION OF THE DRAWINGS

FIG. 2 is a flow chart for explaining timings to perform a check for miswiring.

FIG. 4A to 4C are views illustrating change in a flow rate signal caused by inputting an excitation signal and stopping inputting of the excitation signal.

FIG. 5 is a flow chart for explaining the sequence of a check for miswiring.

FIGS. 10A to 10C are views illustrating the relations between excitation signals and flow rate signals in cases where the measurement tube is filled with water and there is flow, in the normal wiring state or in an miswiring state.

DETAILED DESCRIPTION

Figure 1:
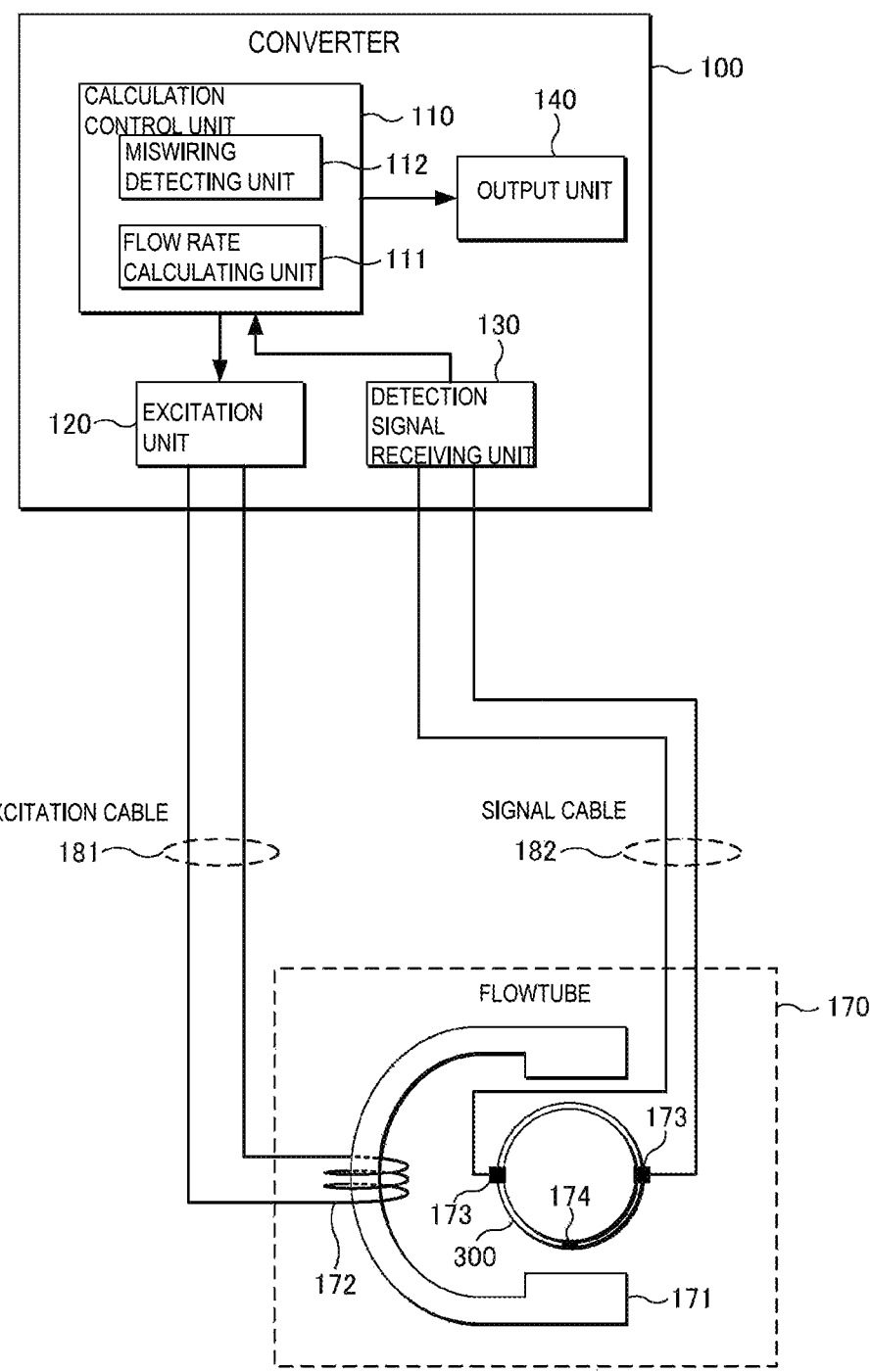
FIG. 1 is a block diagram illustrating the configuration of an electromagnetic flow meter of an embodiment.

An embodiment of the present invention will be described with reference to the accompanying drawings. FIG. 1 is a block diagram illustrating the configuration of an electromagnetic flow meter 10 of the present embodiment. As shown in FIG. 1, the electromagnetic flow meter 10 is configured to include a converter 100 and a flowtube 170.

The flowtube 170 includes a core 171 having a coil 172 wound thereon, and a pair of detection electrodes 173 and an earth electrode 174 attached to a measurement tube 300.

The converter 100 includes a calculation control unit 110 configured to control the operation of the converter, an excitation unit 120 configured to generate and output an excitation signal, a detection signal receiving unit 130 configured to receive a detection signal from the detection electrodes 173 and generate a flow rate signal (for example, a signal proportional to a flow velocity), and an output unit 140 configured to display a measurement result and the like or transmit them to another apparatus.

The detection signal receiving unit 130 includes a differential amplifier and an A/D converter. If acquiring a detection signal from the detection electrodes 173 through a signal cable 182, the detection signal receiving unit amplifies the detection signal by the differential amplifier, and performs A/D conversion on the amplified signal, thereby generating a flow rate signal.

The calculation control unit 110 includes a flow rate calculating unit 111 configured to calculate a flow rate on the basis of the flow rate signal, and a miswiring detection unit 112 configured to perform detection on miswiring on the basis of the flow rate signal. A miswiring checking operation of the miswiring detection unit 112 will be described below. For example, a CPU may implement the miswiring detection unit 112 by executing firmware.

An excitation signal output from the excitation unit 120 is input to the coil 172 through an excitation cable 181, and a detection signal from the detection electrodes 173 is input to the detection signal receiving unit 130 through the signal cable 182.

In the present embodiment, the miswiring detection unit 112 can perform the miswiring checking operation at various timings. For example, as shown in FIG. 2, the miswiring detection unit can perform the miswiring checking operation in STEP S-A when the measurement tube 300 is empty after wiring of STEP S12, and can also perform the miswiring checking operation in STEP S-B after the measurement tube 300 is filled with water in STEP S13 before zero adjustment of STEP S14. Also, the miswiring detection unit can perform the miswiring checking operation in STEP S-C after zero adjustment of STEP S14, and can perform the miswiring checking operation in STEP S-D after an actual operation starts in STEP S15.

However, there is a possibility in which the accuracy of detection on miswiring may decrease when the measurement tube is empty, and it is desirable to prevent from re-performing zero adjustment of STEP S14 in a case where miswiring is detected. Therefore, it is preferable to perform the miswiring checking operation in STEP S-B after the measurement tube 300 is filled with water in STEP S13 before zero adjustment of STEP S14. For this reason, the electromagnetic flow meter 10 may be configured to automatically perform the miswiring checking operation prior to a zero adjusting operation if receiving a zero adjustment instruction.

Figure 3A:
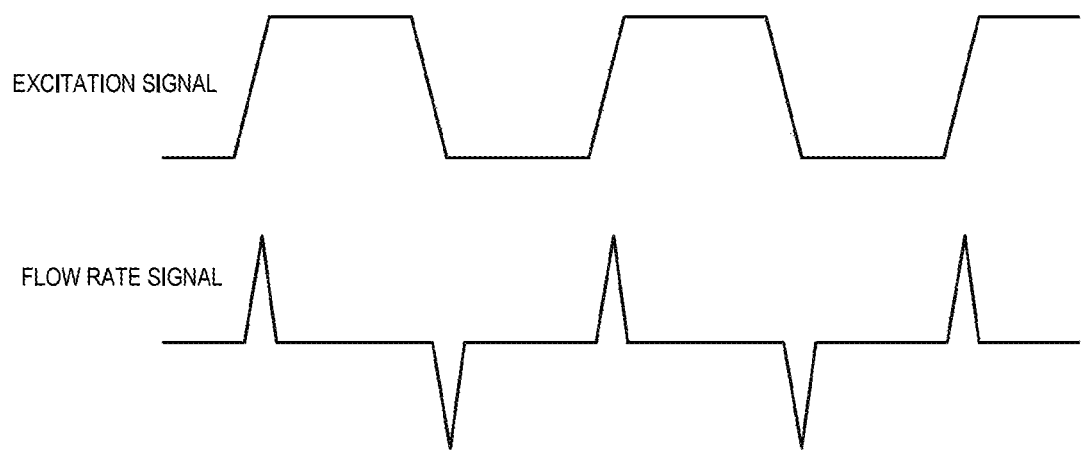
FIGS. 3A and 3B are views illustrating the relation between an excitation signal and a flow rate signal when a measurement tube is filled with water and there is no flow in a normal wiring state.
Figure 3B:
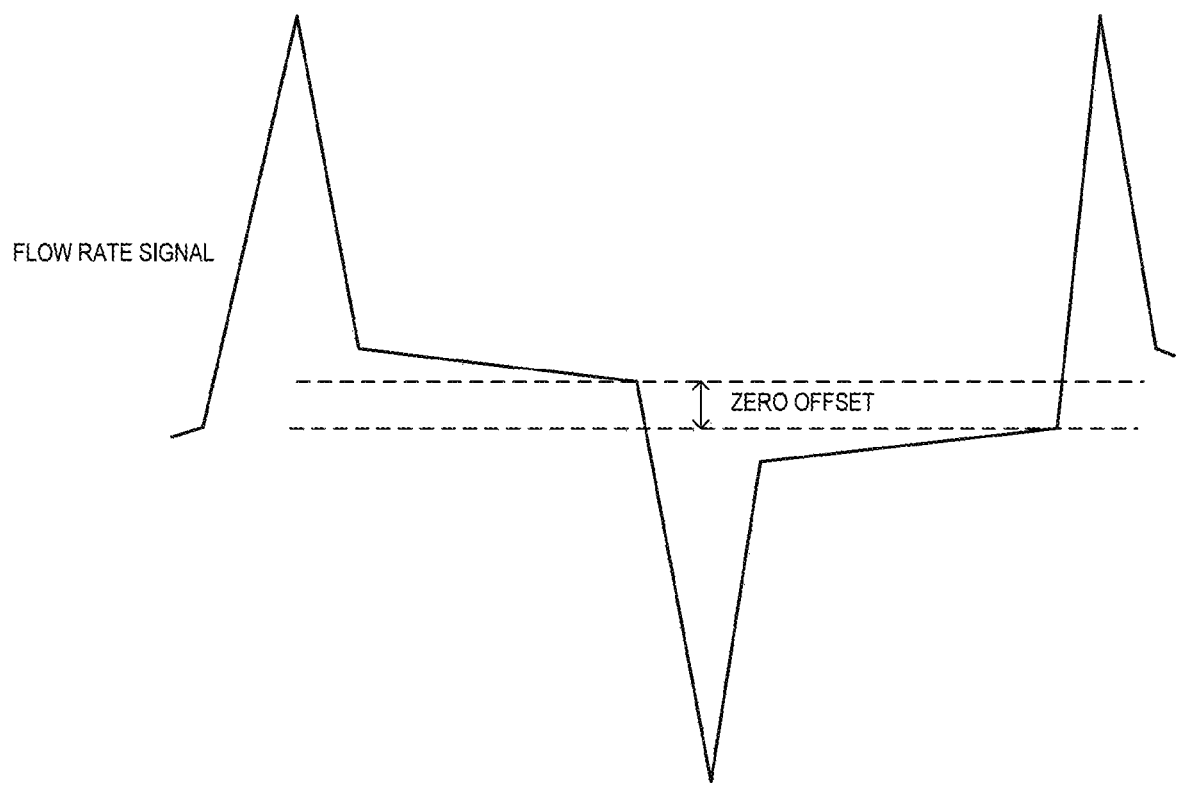

In general, in the electromagnetic flow meter 10, if an excitation signal is output in a state where the measurement tube is filled with water and there is no flow, as shown in FIG. 3A, at risings and fallings of the excitation signal, a spike-like noise called as differential noise occurs in a flow rate signal. In this case, the detection signal receiving unit 130 generates the flow rate signal including the differential noise, and the differential noise and a residual magnetic field causes a zero offset in the flow rate signal as shown in the enlarged view FIG. 3B. In order to correct the zero offset, zero adjustment can be performed. Also, the differential noise is clearly measured when the measurement tube is filled with water, however, it can also be measured even when the measurement tube is not filled with water.

Figure 13:
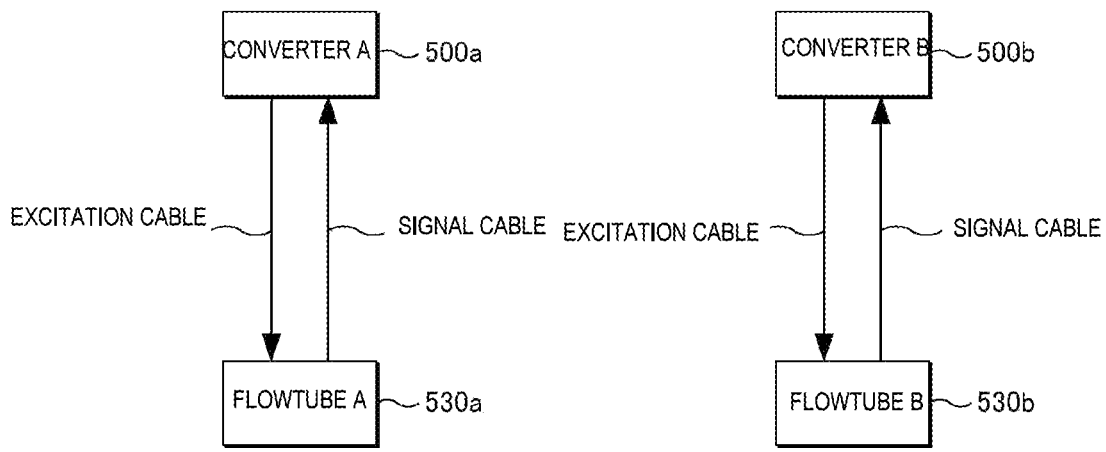
FIG. 13 is a view illustrating a normal wiring state of electromagnetic flow meters.

Meanwhile, in a normal wiring state as shown in FIG. 13, if outputting of the excitation signal is stopped, as shown in FIG. 4A, occurrence of the differential noise in the flow rate signal of the converter A 500a also stops. In other words, the differential noise state depends on whether the excitation signal is being output or not.

Figure 14A:
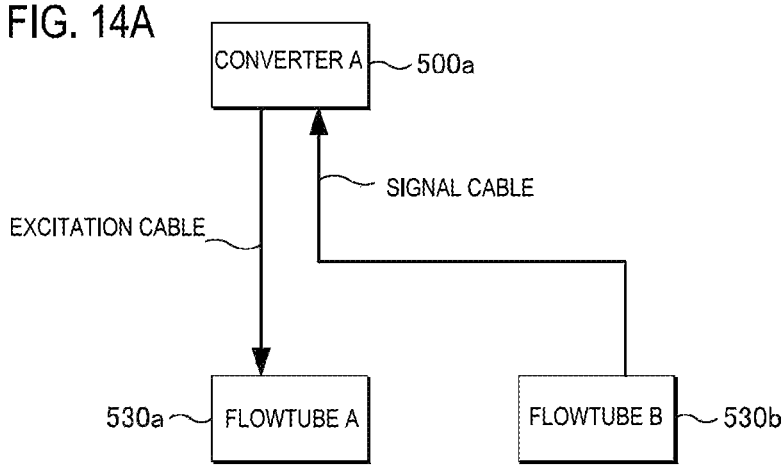
FIGS. 14A and 14B are views illustrating examples of miswiring of the electromagnetic flow meters.
Figure 14B:
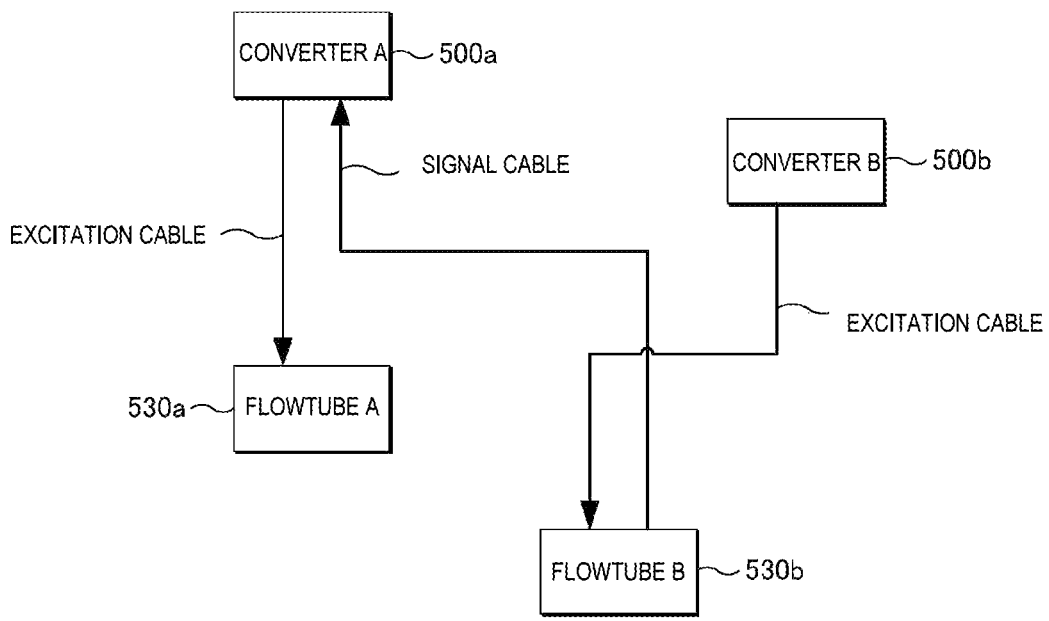
Figure 15A:
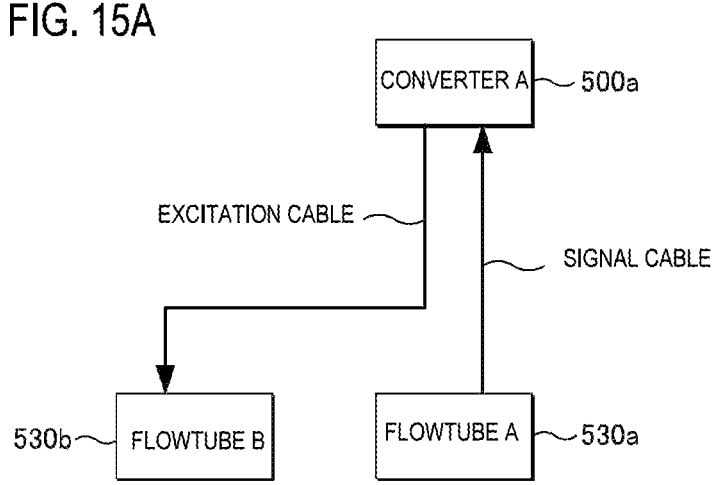
FIGS. 15A and 15B are views illustrating other examples of miswiring of the electromagnetic flow meters.
Figure 15B:
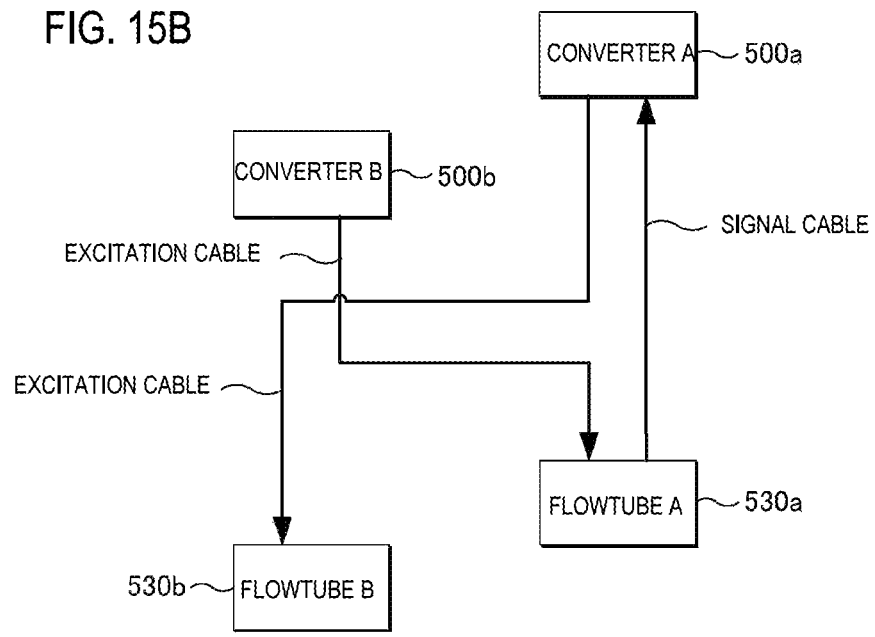

Meanwhile, in a case where miswiring occurs in a signal cable, and thus a flowtube which is the destination of the miswiring (the flowtube B 530b) receives an excitation signal from the other converter (the converter B 500b) as shown in FIG. 14B, or in a case where miswiring occurs in an excitation cable, and thus the flowtube A 530a receives an excitation signal from the other converter (the converter B 500b) as shown in FIG. 15B, as shown in FIG. 4B, even if outputting of the excitation signal from the converter A 500a is stopped, differential noise keeps on occurring in the flow rate signal of the converter A 500a. In other words, the differential noise state is maintained regardless of whether the excitation signal is being output or not.

Also, in a case where miswiring occurs in a signal cable, and thus a flowtube which is the destination of the miswiring (the flowtube B 530b) cannot receive an excitation signal from any converter as shown in FIG. 14A, or in a case where miswiring occurs in an excitation cable, and thus the flowtube A 530a cannot receive an excitation signal from any converter as shown in FIG. 15A, as shown in FIG. 4C, differential noise does not occur in the flow rate signal of the converter A 500a regardless of whether the excitation signal is being output or not. In other words, the differential noise state is maintained regardless of whether the excitation signal is being output or not.

For this reason, it is possible to perform detection on miswiring by measuring whether differential noise occurs when the excitation signal is being output and whether differential noise occurs when the excitation signal is not being output. Specifically, in a case where the magnitude of differential noise is maintained regardless of whether the excitation signal is being output or not (the case of FIG. 4B or 4C), it is possible to determine miswiring. In the present embodiment, detection on miswiring is performed in a sequence as shown in the flow chart of FIG. 5.

The miswiring detecting operation may be automatically performed prior to zero adjustment as described above, and may be performed at an arbitrary timing in response to a user's instruction. Alternatively, the miswiring detecting operation may be performed whenever the electromagnetic flow meter is activated, and may be performed in response to an instruction received from another apparatus by communication.

First, in a state where an excitation cable and a signal cable are installed, in STEP S101, the excitation unit 120 outputs the excitation signal. Then, in STEP S102, the detection signal receiving unit 130 generates a flow rate signal.

Figure 6A:
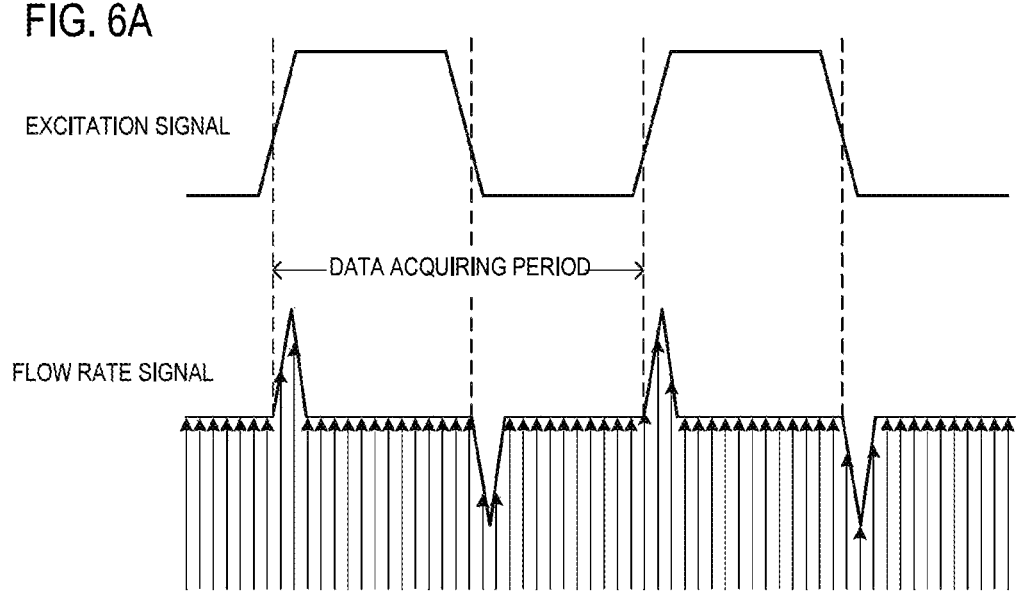
FIGS. 6A and 6B are views for explaining a data acquiring period for generating a flow rate signal.
Figure 6B:
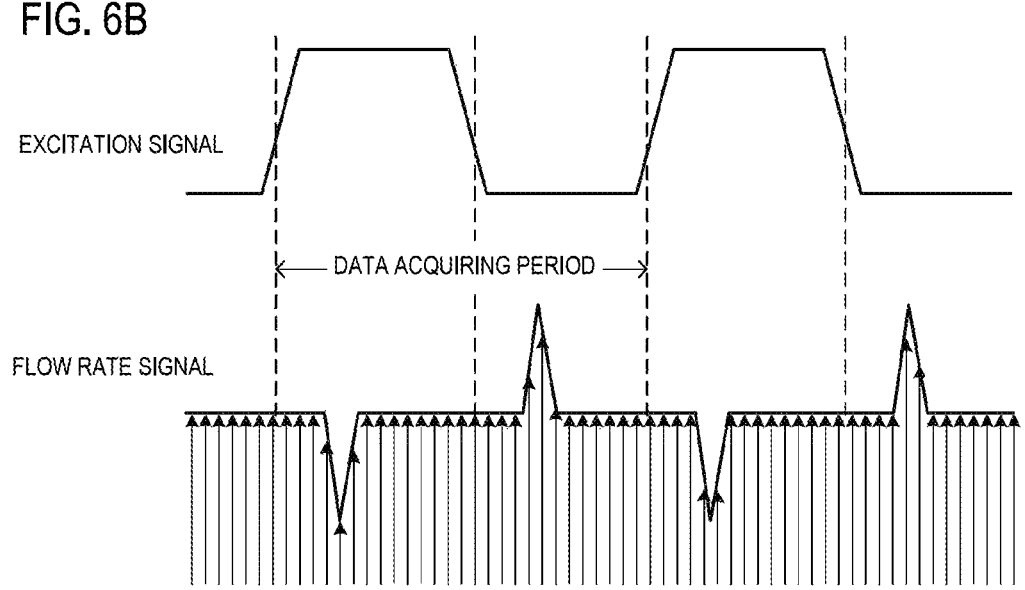

It is preferable to set a data acquiring period for generating a flow rate signal as a predetermined period in advance such that at least one cycle of the excitation signal is secured as shown in FIG. 6A. The reason is that, in a miswiring state, as shown in FIG. 6B, the change timings of the excitation signal may not be in sync with the timings of occurrence of differential noise.

In other words, in a normal wiring state, differential noise occurs in sync with the change timings of the excitation signal. However, for example, in a case where miswiring as shown in FIG. 14B has occurred, differential noise occurs at the change timings of the excitation signal of the converter B 500b unrelated to the change timings of the excitation signal of the converter A 500a. Therefore, in order to detect the differential noise, a data acquiring period corresponding to at least one cycle of the excitation signal is required. However, if the timings of occurrence of the differential noise are known, a differential-noise occurrence section may be extracted as a data acquiring period. In a case of using a dual-frequency excitation system using a signal obtained by superimposing a short cycle excitation signal and a long cycle excitation signal, it is required to secure one cycle of the short cycle excitation signal.

Figure 7:
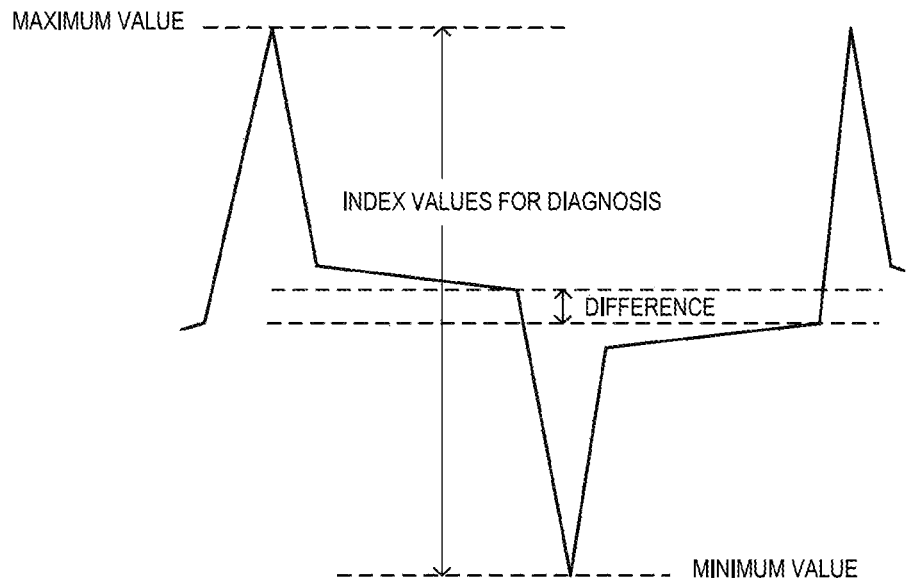
FIG. 7 is a view for explaining index values for diagnosis.

Returning to the description of FIG. 5, if the flow rate signal is generated, in STEP S103, on the basis of the generated flow rate signal, the miswiring detection unit 112 calculates an index value for diagnosis. Here, the index value for diagnosis is an index for evaluating the magnitude of differential noise, and can be set to the difference between the maximum value and minimum value of the flow rate signal in the data acquiring period as shown in FIG. 7. At this time, in order to avoid the influence of a zero offset, a value corresponding to a zero adjustment value may be subtracted from the difference between the maximum value and the minimum value.

Subsequently, in STEP S104, the index value for diagnosis calculated in response to output of the excitation signal is recorded as the index value of the excitation signal output period.

Subsequently, in STEP S105, the excitation signal is stopped, and in STEP S106, a flow rate signal is generated. If the flow rate signal is generated, in STEP S107, on the basis of the generated flow rate signal, an index value for diagnosis is calculated, and in STEP S108, the calculated index value is recorded as the index value of the excitation signal output stop period. The generation of the flow rate signal and the calculation of the index value for diagnosis can be performed in the same way as that of the excitation signal output period. Although the index value of the excitation signal output period is first calculated, the index value of the excitation signal output stop period may be first calculated.

Figure 8:
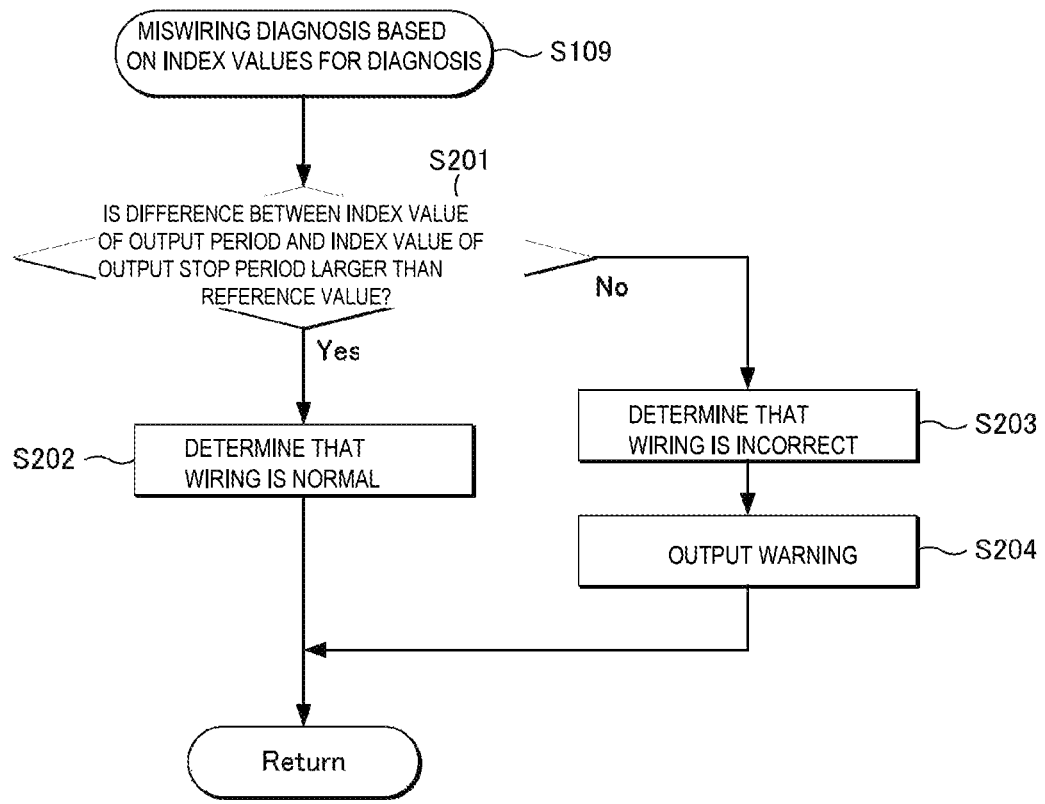
FIG. 8 is a flow chart for explaining a specific sequence of miswiring diagnosis.

Subsequently, in STEP S109, on the basis of the index value of the excitation signal output period and the index value of the excitation signal output stop period, the miswiring detection unit 112 performs miswiring diagnosis. In the miswiring diagnosis, as shown in FIG. 8, in STEP S201, a change amount which is the difference between the index value of the excitation signal output period and the index value of the excitation signal output stop period is larger than a predetermined reference value, or not.

In a case where the change amount exceeds the reference value ("Yes" in STEP S201), in STEP S202, it is determined that the wiring is normal. Meanwhile, in a case where the change amount is equal to or smaller than the reference value ("No" in STEP S201), in STEP S203, it is determined that the wiring is incorrect, and in STEP S204, a warning is output for a user or to another apparatus through the output unit 140. Therefore, the user can quickly fix the miswiring.

As described above, the electromagnetic flow meter 10 of the present embodiment performs miswiring diagnosis on the basis of the amount of change in differential noise between an excitation signal output period and an excitation signal output stop period, and thus can easily detect miswiring of the electromagnetic flow meter.

Also, in the above-described embodiment, when the measurement tube is filled with water and there is no flow, the miswiring detecting operation is performed. However, the miswiring detecting operation may be performed when the measurement tube is filled with water and there is a flow. In this case, since differential noise is superimposed on the change amount of the flow rate signal as shown in FIGS. 9A to 9C, the difference between the index value of the excitation signal output period and the index value of the excitation signal output stop period in the normal wiring state further increases, and thus determination on miswiring detection becomes easy.

Figure 9A:
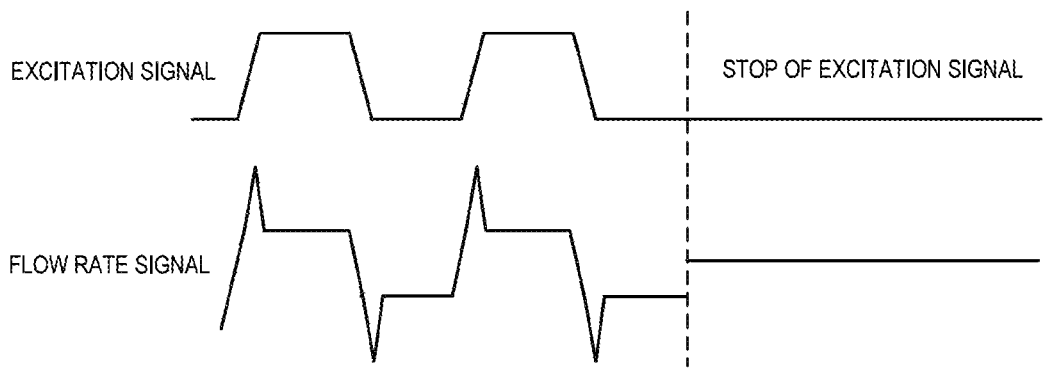
FIGS. 9A to 9C are views illustrating the relations between excitation signals and flow rate signals including differential noise in cases where the measurement tube is filled with water and there is flow, in the normal wiring state and an miswiring state.

Specifically, in a normal wiring state as shown in FIG. 13, if outputting of the excitation signal is stopped, as shown in FIG. 9A, change of the flow rate signal of the converter A 500a and differential noise also stop. In other words, the state of the flow rate signal changes depending on whether the excitation signal is being output or not.

Figure 9B:
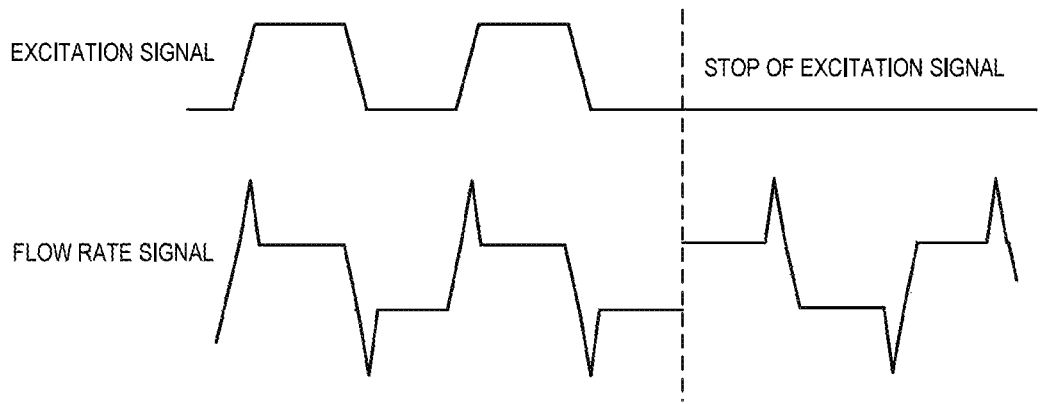

Meanwhile, in a case where miswiring occurs in a signal cable, and thus a flowtube which is the destination of the miswiring (the flowtube B 530b) receives an excitation signal from the other converter (the converter B 500b) as shown in FIG. 14B, or in a case where miswiring occurs in an excitation cable, and thus the flowtube A 530a receives an excitation signal from the other converter (the converter B 500b) as shown in FIG. 15B, as shown in FIG. 9B, even if outputting of the excitation signal from the converter A 500a is stopped, the flow rate signal of the converter A 500a keeps on changing, and differential noise keeps on occurring in the flow rate signal of the converter A 500a. In other words, the state of the flow rate signal is maintained regardless of whether the excitation signal is being output or not.

Figure 9C:
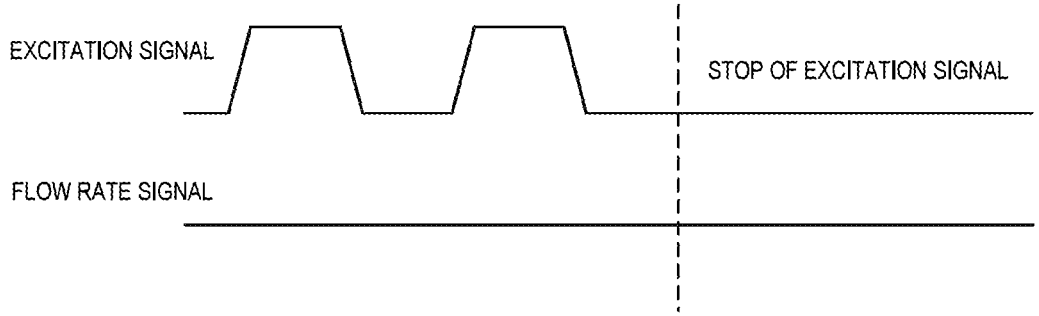
Figure 11:
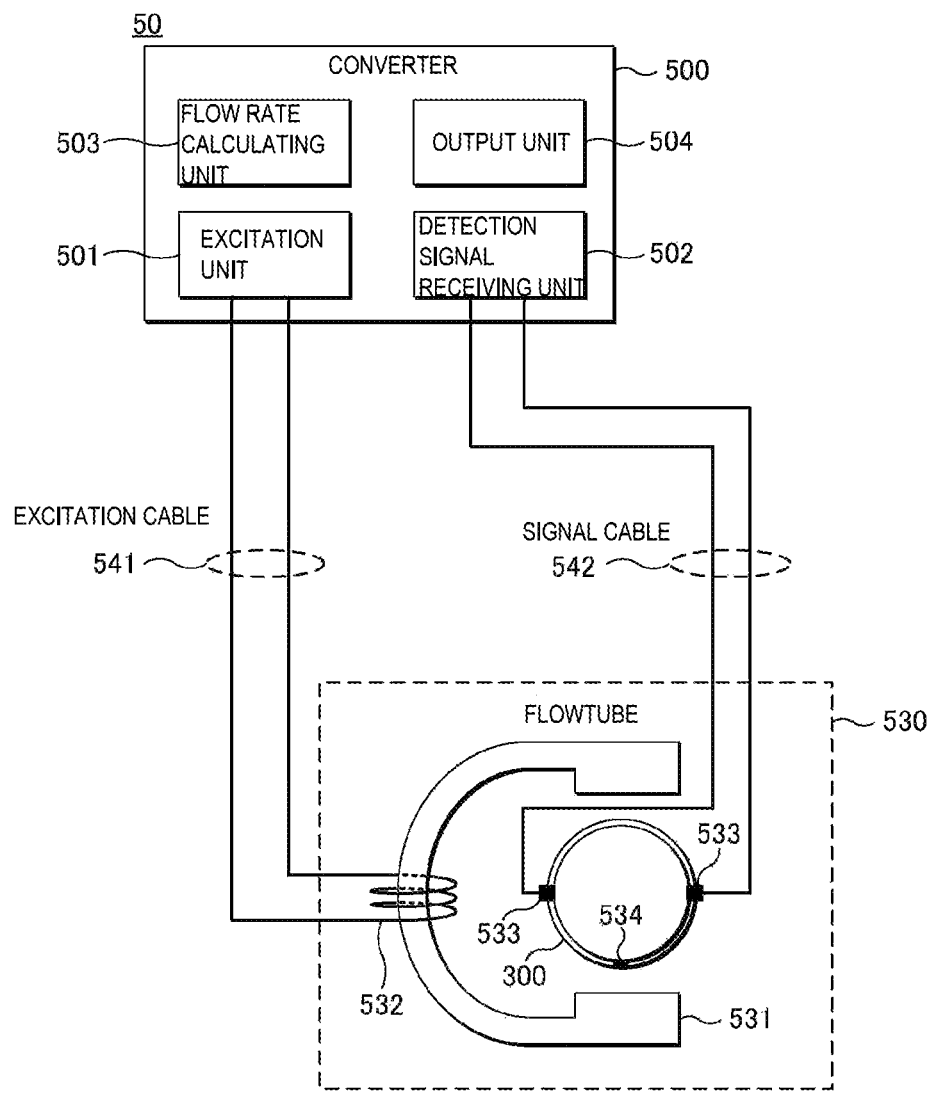
FIG. 11 is a block diagram illustrating the configuration of an electromagnetic flow meter of the related art.
Figure 12:
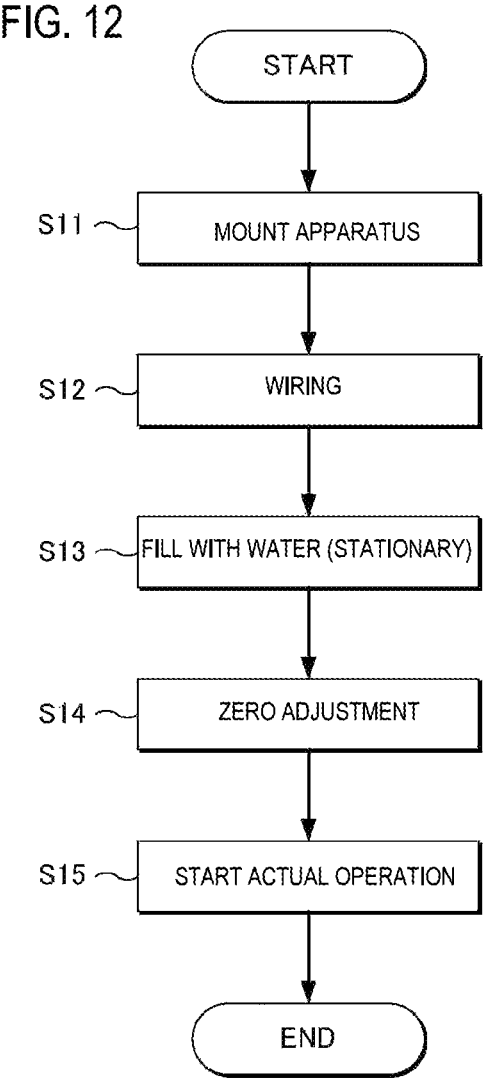
FIG. 12 is a flow chart for explaining a sequence in a case of mounting the electromagnetic flow meter.

Also, in a case where miswiring occurs in a signal cable, and thus a flowtube which is the destination of the miswiring (the flowtube B 530b) cannot receive an excitation signal from any converter as shown in FIG. 14A, or in a case where miswiring occurs in an excitation cable, and thus the flowtube A 530a cannot receive an excitation signal from any converter as shown in FIG. 15A, as shown in FIG. 9C, regardless of whether the excitation signal is being output or not, the flow rate signal of the converter A 500a does not change, and differential noise does not occur. In other words, the state of the flow rate signal is maintained regardless of whether the excitation signal is being output or not.

For this reason, when the measurement tube is filled with water and there is a flow, in the miswiring detecting operation, it is possible to perform miswiring detection on the basis of change in the state of the flow rate signal, without considering differential noise.

Specifically, in a normal wiring state as shown in FIG. 13, if outputting of the excitation signal is stopped, as shown in FIG. 10A, change of the flow rate signal of the converter A 500a also stops. In other words, in a case where the state of the flow rate signal changes depending on whether the excitation signal is being output or not, it is possible to determine that the wiring is normal.

Meanwhile, in a case where miswiring occurs in a signal cable, and thus a flowtube which is the destination of the miswiring (the flowtube B 530b) receives an excitation signal from the other converter (the converter B 500b) as shown in FIG. 14B, or in a case where miswiring occurs in an excitation cable, and thus the flowtube A 530a receives an excitation signal from the other converter (the converter B 500b) as shown in FIG. 15B, as shown in FIG. 10B, even if outputting of the excitation signal from the converter A 500a is stopped, the flow rate signal of the converter A 500a keeps on changing.

Also, in a case where miswiring occurs in a signal cable, and thus a flowtube which is the destination of the miswiring (the flowtube B 530b) cannot receive an excitation signal from any converter as shown in FIG. 14A, or in a case where miswiring occurs in an excitation cable, and thus the flowtube A 530a cannot receive an excitation signal from any converter as shown in FIG. 15A, as shown in FIG. 10C, regardless of whether the excitation signal is being output or not, the flow rate signal of the converter A 500a does not change.

In other words, in a case where the state of the flow rate signal is maintained regardless of whether the excitation signal is being output or not, it is possible to determine that the wiring is incorrect. Whether the state of the flow rate signal has changed can be determined on the basis of whether the difference between the change amount of the flow rate signal (the difference between the maximum value and the minimum value in the data acquiring period) when the excitation signal is being output and the change amount of the flow rate signal when the excitation signal is not being output exceeds the predetermined reference value. In this case, the index values for diagnosis mean indexes for evaluating the magnitude of the flow rate signal.

Even in the case of performing miswiring detection on the basis of stage change of a flow rate signal, it is preferable to set a data acquiring period for generating a flow rate signal as a predetermined period in advance such that at least one cycle of the excitation signal is secured as shown in FIG. 6A. Also, in a case of using a dual-frequency excitation system using a signal obtained by superimposing a short cycle excitation signal and a long cycle excitation signal, it is required to secure one cycle of the short cycle excitation signal.

In the above-described embodiment, the miswiring detection unit 112 for detecting miswiring is installed inside the converter 100 of the electromagnetic flow meter 10. However, the miswiring detection unit 112 may be an apparatus independent from the electromagnetic flow meter 10. Also, the index value of the excitation signal output period and the index value of the excitation signal output stop period are calculated on the basis of the sampling values of the flow rate signal. However, it is also possible to separately provide a circuit for detecting peaks of the flow rate signal, and detect the index value of the excitation signal output period and the index value of the excitation signal output stop period by hardware.

Also, the difference between the maximum value and minimum value of the flow rate signal is set as an index value for diagnosis. However, the maximum value or minimum value of the flow rate signal may be set as an index value for diagnosis.

Also, the present invention can be applied not only to electromagnetic flow meters but also to other devices such as a field device and an analysis device for outputting excitation signals and performing measurement using sensor signals corresponding to the excitation signals.

What is claimed is:

1. An electromagnetic flow meter comprising:
   a flowtube including a coil disposed in the vicinity of a measurement tube, and electrodes disposed on the measurement tube;
   a converter including an excitation unit configured to generate an excitation signal and output the excitation signal to the coil through an excitation cable, and a detection signal receiving unit configured to receive a detection signal from the electrodes through a signal cable, and generate a flow rate signal; and
   a miswiring detection unit configured to calculate a first change amount between a maximum value and a minimum value of the flow rate signal in a predetermined period when the excitation signal is being output and a second change amount between a maximum value and a minimum value of the flow rate signal in the predetermined period when the excitation signal is not being output, and calculate a difference between the first change amount and the second change amount, and perform miswiring diagnosis on the excitation cable or the signal cable based on the calculated difference
   wherein the predetermined period is a period equal to or longer than one cycle of the excitation signal.

2. The electromagnetic flow meter according to claim 1, wherein:
   in a case where difference between the first change amount and the second change amount does not exceed a predetermined reference value, the miswiring detection unit determines that miswiring occurs in the excitation cable or the signal cable.

3. The electromagnetic flow meter according to claim 1, wherein:
   the change amount of the flow rate signal is a value directly or indirectly representing a magnitude of differential noise included in the flow rate signal.

4. A miswiring detection method of an electromagnetic flow meter which includes a flowtube including a coil disposed in the vicinity of a measurement tube, and electrodes disposed on the measurement tube, and a converter including an excitation unit configured to generate an excitation signal and output the excitation signal to the coil through an excitation cable, and a detection signal receiving unit configured to receive a detection signal from the electrodes through a signal cable, and generate a flow rate signal, the method comprising:
   calculating a first change amount between a maximum value and a minimum value of the flow rate signal in a predetermined period when the excitation signal is being output and a second change amount between a maximum value and a minimum value of the flow rate signal in the predetermined period when the excitation signal is not being output;
   calculating a difference between the first change amount and the second change amount; and
   performing miswiring diagnosis on the excitation cable or the signal cable based on the calculated difference,
   wherein
   the predetermined period is a period equal to or longer than one cycle of the excitation signal.

5. An electromagnetic flow meter comprising:
   a flowtube;
   a converter configured to output an excitation signal to the flowtube through an excitation cable, and receive a detection signal from the flowtube through a signal cable, and generate a flow rate signal based on the detection signal; and
   a miswiring detection unit configured to, in response to the excitation signal being output calculate a first change amount of the flow rate signal as a difference between a maximum value and a minimum value of the flow rate signal in a predetermined period, and in response to the excitation signal being stopped calculate a second change amount of the flow rate signal as a difference between a maximum value and a minimum value of the flow rate signal in the predetermined period, and calculate a difference between the first change amount and the second change amount, and determine a miswiring of the electromagnetic flow meter based on the calculated difference between the first change amount and the second change amount,
   wherein
   the predetermined period is greater than or equal to one cycle of the excitation signal.

6. The electromagnetic flow meter according to claim 5, wherein in response to the difference between the first change amount and the second change amount being equal to or less than a reference value, the miswiring detection unit determines that the miswiring occurs.

7. The electromagnetic flow meter according to claim 5, wherein each of the first change amount and the second change amount represents a magnitude of differential noise included in the flow rate signal.

* * * * *